United States Patent
Brown et al.

(10) Patent No.: US 8,616,011 B2
(45) Date of Patent: Dec. 31, 2013

(54) INTERNAL CLEARING FUNCTION FOR A REFRIGERANT RECOVERY/RECHARGE MACHINE

(75) Inventors: William Brown, Owatonna, MN (US); Gary Murray, Montpelier, OH (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 131 days.

(21) Appl. No.: 12/974,931

(22) Filed: Dec. 21, 2010

(65) Prior Publication Data

US 2011/0146304 A1    Jun. 23, 2011

Related U.S. Application Data

(63) Continuation of application No. 11/289,326, filed on Nov. 30, 2005, now Pat. No. 7,854,130.

(60) Provisional application No. 60/631,603, filed on Nov. 30, 2004.

(51) Int. Cl.
 *F25B 45/00*    (2006.01)

(52) U.S. Cl.
 USPC .................................. 62/77; 62/292

(58) Field of Classification Search
 USPC ........ 62/149, 292, 77, 303, 85, 470, 468, 475
 See application file for complete search history.

(56) References Cited

U.S. PATENT DOCUMENTS

| | | | |
|---|---|---|---|
| 2,907,460 A | 10/1959 | Welch | |
| 4,261,178 A | 4/1981 | Cain | |
| 4,768,347 A | 9/1988 | Manz et al. | |
| 4,809,520 A | 3/1989 | Manz et al. | |
| 4,938,031 A | 7/1990 | Manz et al. | |
| 4,942,741 A * | 7/1990 | Hancock et al. | 62/292 |
| 5,005,369 A | 4/1991 | Manz | |
| 5,090,211 A * | 2/1992 | Peters | 62/149 |
| 5,214,931 A | 6/1993 | Paige | |
| 5,220,810 A * | 6/1993 | Keltner | 62/292 |
| 5,231,843 A | 8/1993 | Keltner | |
| 5,248,125 A | 9/1993 | Fritch et al. | |
| 5,249,434 A | 10/1993 | Abraham | |
| 5,255,527 A * | 10/1993 | Paige | 62/85 |
| 5,277,033 A * | 1/1994 | Sanford et al. | 62/149 |
| 5,295,367 A * | 3/1994 | Keltner | 62/292 |

(Continued)

FOREIGN PATENT DOCUMENTS

| JP | 09-309599 | 12/1997 |
|---|---|---|
| JP | 09309599 A * | 12/1997 |
| JP | 2002-340448 | 11/2002 |

OTHER PUBLICATIONS

Abstract of JP 09309599 A to Ishii, Tetsuya.*

(Continued)

*Primary Examiner* — Mohammad M Ali
(74) *Attorney, Agent, or Firm* — Baker & Hostetler LLP

(57) ABSTRACT

An apparatus and method providing a refrigeration servicing system that comprises a clean refrigerant source, a recovery circuit and a flushing circuit. The recovery circuit can be configured to recover refrigerant from a cooling system. After recovery cycle is completed, the flushing circuit that is coupled to the recovery circuit can flush clean refrigerant through the recovery circuit. A housing can be provided and configured to house the refrigerant source, the recovery circuit and the flushing circuit.

19 Claims, 4 Drawing Sheets

(56) References Cited

U.S. PATENT DOCUMENTS

| | | | |
|---|---|---|---|
| 5,353,603 A * | 10/1994 | Outlaw et al. | 62/149 |
| 5,415,003 A * | 5/1995 | Bertva et al. | 62/85 |
| 5,533,358 A * | 7/1996 | Crandall et al. | 62/292 |
| 5,533,359 A | 7/1996 | Muston et al. | |
| 5,540,254 A | 7/1996 | McGowan et al. | |
| 5,560,215 A * | 10/1996 | Talarico | 62/149 |
| 5,603,223 A | 2/1997 | Murray et al. | |
| 5,603,224 A | 2/1997 | Scaringe et al. | |
| 5,626,170 A | 5/1997 | Parker | |
| 5,758,506 A * | 6/1998 | Hancock et al. | 62/77 |
| 5,761,914 A | 6/1998 | Carey et al. | |
| 5,802,859 A | 9/1998 | Zugibe | |
| 5,906,106 A | 5/1999 | Brown et al. | |
| 5,997,825 A * | 12/1999 | Satyapal et al. | 422/177 |
| 6,016,661 A | 1/2000 | Sagar | |
| 6,119,475 A | 9/2000 | Murray et al. | |
| 6,134,462 A | 10/2000 | Rantala | |
| 6,134,896 A | 10/2000 | Brown et al. | |
| 6,134,899 A | 10/2000 | Brown et al. | |
| 6,138,462 A | 10/2000 | Murray et al. | |
| D433,346 S | 11/2000 | Evans et al. | |
| 6,141,977 A * | 11/2000 | Zugibe | 62/149 |
| 6,185,944 B1 | 2/2001 | Gaul | |
| 6,185,945 B1 * | 2/2001 | Pfefferle et al. | 62/149 |
| 6,202,433 B1 * | 3/2001 | Murray et al. | 62/292 |
| 6,247,325 B1 | 6/2001 | Muston et al. | |
| 6,272,871 B1 | 8/2001 | Eisenhour | |
| 6,334,320 B1 | 1/2002 | Brown et al. | |
| 6,360,551 B1 | 3/2002 | Renders | |
| 6,374,872 B1 | 4/2002 | Tarabocchia | |
| 6,378,657 B2 | 4/2002 | Viken | |
| 6,442,963 B1 * | 9/2002 | Pfefferle et al. | 62/475 |
| 6,553,827 B2 | 4/2003 | McCormick | |
| 7,033,508 B2 | 4/2006 | Sullivan | |
| 7,086,237 B2 | 8/2006 | Arshansky et al. | |
| 7,260,943 B2 | 8/2007 | Carrubba et al. | |
| 2002/0170617 A1 | 11/2002 | Veenstra et al. | |
| 2004/0061089 A1 | 4/2004 | Payne | |

OTHER PUBLICATIONS

Translation of JP 09309599 A to Ishii Tetsuya.*

* cited by examiner

INTERNAL CLEARING FUNCTION FOR A REFRIGERANT RECOVERY/RECHARGE MACHINE

CROSS-REFERENCE TO RELATED APPLICATIONS

This application claims priority to, and is a continuation, of pending U.S. patent application entitled, Internal Clearing Function for a Refrigerant Recovery/Recharge Machine, filed Nov. 30, 2005, having a Ser. No. 11/289,326, which claims priority to U.S. Provisional Application No. 60/631,603, entitled Internal Clearing Function for a Refrigerant Recovery/Recharge Machine, filed Nov. 30, 2004. This application claims priority to both of the applications mentioned above and the disclosure of the above mentioned applications are hereby incorporated by reference in their entirety.

FIELD OF THE INVENTION

The present invention relates generally to an apparatus and method for servicing refrigeration systems. More particularly, the present invention relates to an internal clearing function for a refrigeration servicing unit.

BACKGROUND OF THE INVENTION

In recent years, the maintenance of vehicle refrigerant systems has been accomplished utilizing closed-circuit recovery devices that prevent the discharge of refrigerant into the atmosphere. Such systems are typically self-contained units with the capability of recovering the refrigerant from the vehicle and subsequently recharging the system.

Air conditioning system additives removed from vehicle air conditioning systems can cause swelling and breakdown of elastomers, for example, in the inlet of the refrigeration servicing unit. Such elastomers may include, for example, O-rings and solenoids located within the refrigeration servicing unit. Additionally, different types of oil may be utilized in various vehicles. For example, conventional vehicles typically require different types of oil than that of oils utilized by hybrid vehicles and are generally not compatible with each other. Hence, it is important to ensure that one oil (compatible with a certain kind of vehicle) is not introduced into a different type of vehicle (which is not compatible with that oil). Accordingly, it is desirable to provide a method and apparatus that limits the exposure of elastomers to additives and prevents cross contamination of oils between the vehicles being serviced.

SUMMARY OF THE INVENTION

The foregoing needs are met, to a great extent, by the present invention, wherein an apparatus and method provide an internal clearing or flushing function for a refrigeration servicing unit so as to minimize the exposure of the elastomeric circuitry of the refrigeration servicing unit and the systems it services to additives and cross-contaminating oils.

In accordance with one embodiment of the present invention, a refrigeration servicing apparatus for a vehicle that can include a clean refrigerant source, a recovery circuit configured to recover refrigerant from a cooling system, a flushing circuit coupled to the recovery circuit and the refrigerant source, which can flush clean refrigerant through the recovery circuit, a processor that can control the recovery and flushing circuits, and a housing configured to house the refrigerant source, the processor, the recovery unit and the flushing circuit.

In another embodiment of the present invention, a refrigeration servicing unit for servicing a cooling system of a vehicle that can include refrigerant source means for providing clean refrigerant, recovery means for recovering refrigerant from the cooling system, and a flushing means in communication with the recovery means for flushing clean refrigerant through the recovery means. It also can include a processor means configured to the house refrigerant source means and a housing means configured to house the recovery means, the processor means, recovery means and the flushing means.

Yet another embodiment according to the present invention provides a method of flushing a refrigeration servicing unit that can include sensing that the hoses of a recovery circuit are disconnected from a cooling system of a vehicle, evacuating the hoses with a vacuum, and flushing the recovery circuit with a clean refrigerant.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
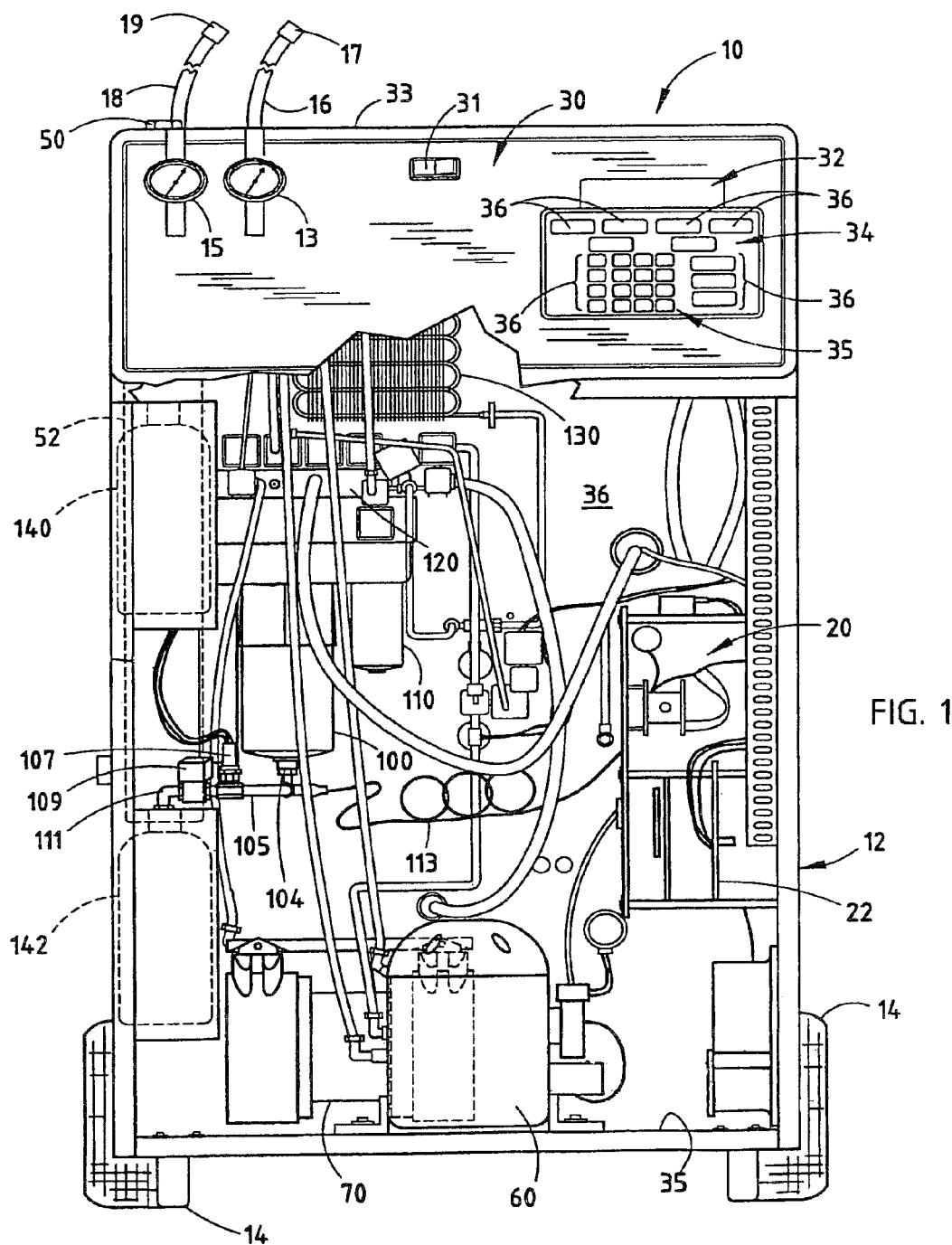
FIG. 1 is a front elevational view, partly broken away, of a refrigerant maintenance system, which incorporates an embodiment of the present invention.

An embodiment in accordance with the present invention provides a method and apparatus for providing expandability and functionality of a refrigeration servicing unit. An embodiment in accordance with the present invention also provides a method and apparatus that limits the exposure of components of the servicing unit, such as elastomers to additives and prevents cross contamination of oils between vehicle refrigeration systems being serviced. Embodiments of the invention will now be described with reference to the drawing figures, in which like reference numerals refer to like parts throughout.

FIG. 1 is a front elevational view, partly broken away, of a refrigerant maintenance system, which incorporates an embodiment of the present invention. The maintenance system can be a refrigeration servicing unit 10 that couples to and maintains a cooling system such as, for example, a refrigerant circuit for a vehicle's air conditioning system. The unit 10 can be configured as a portable machine mounted within a cabinet or housing 12. The housing 12 can be supported by a plurality of wheels 14, such that it can be conveniently moved to the situs of a vehicle. Unit 10 can include a recovery circuit for coupling to the vehicle's cooling system. The recovery circuit can include a high pressure hose 16 with a coupling 17 which may be coupled, for instance, to a vehicle's high pressure port. The recovery circuit can further include a low pressure hose 18 having a coupling 19, which may be coupled to a low pressure port of the vehicle's refrigerant circuit. The front panel of the housing is shown broken away in FIG. 1 to show the major elements of the system which are also identified by similar numbers in the flow diagram of FIG. 2.

In one embodiment, the unit 10 can include an electronic control module 20 integrally including a microprocessor on a circuit board 22 for controlling the electromechanical solenoid valves and for receiving input information from the pressure sensors and control switches of unit 10 so as to control the recovery and/or flushing processes. A control panel 30 can further include an on/off switch 31 and a display 32 for displaying the operational status of the unit's 10 operation. The display 32 may be an LCD display or other suitable electronic display coupled to the microprocessor via a conventional input/output circuit. The control panel 30 can further include a switch panel 34 having a conventional keyboard 35 and a plurality of push-button switches 36 for controlling the operation of the unit 10 through its various phases of operation and/or for selecting parameters for display. Thus, the keyboard 35 in conjunction with the operational switches 36 and display 32 can allow an operator to enter the desired operational parameters for the unit 10 according to manufacturer's specifications for servicing an air conditioner unit in a particular vehicle.

Figure 2:
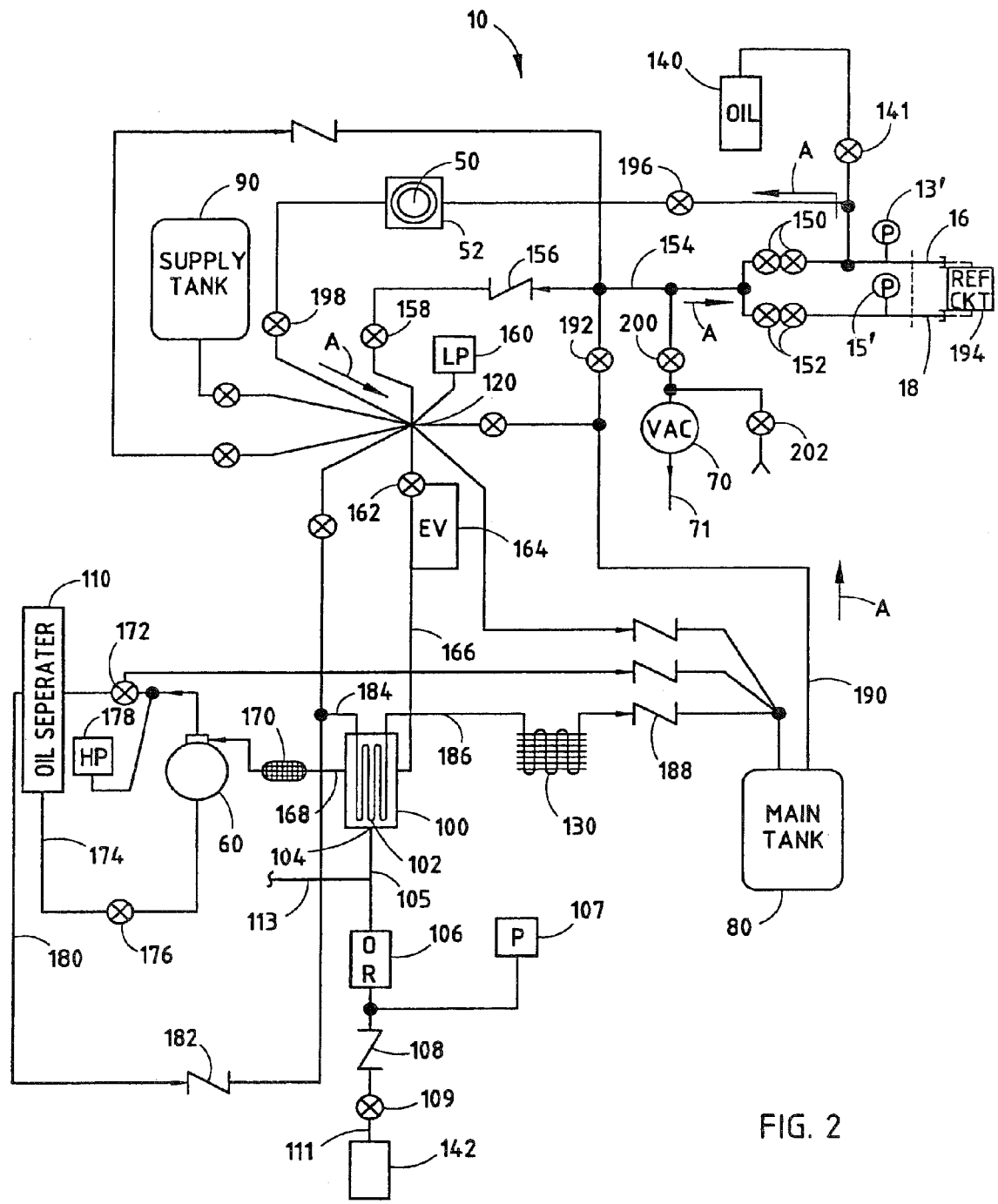
FIG. 2 is a schematic flow diagram of the refrigerant maintenance system incorporated in the system shown in FIG. 1.

The input hoses 16 and 18 can be coupled to mechanical pressure gauges 13 and 15, respectively, which can be mounted on the front panel of the unit 10, as seen in FIG. 1. In addition, electrical pressure transducers 13' and 15' can be coupled to the hoses 16 and 18 as shown in FIG. 2, and can be further coupled to the microprocessor through conventional input/output circuits to provide the microprocessor with information as to the current pressure in the hoses during operation of the unit. Gauges 13 and 15 may further provide the operator with a conventional analog display of the pressure as well. A sight gauge 50 can be mounted to a top surface 33 of housing 12, and a filter cartridge 52 can be mounted to the housing 12 for filtering particulate material from the refrigerant during the flushing cycle, as described in greater detail below. The unit 10 can further include a compressor 60 and a vacuum pump 70 disposed within the housing 12.

The unit 10 can also include a flushing circuit for facilitating the internal clearing function of the unit 10. More specifically, the flushing circuit can include a clean refrigerant source. The source can be provided by a main tank 80 and a supply tank 90 of clean refrigerant (FIG. 2). The main tank 80 and the supply tank 90 can be disposed within the housing 12, for example, mounted behind the front of housing 12 and on an extension of floor 35. The supply tank 90 may be utilized to supply additional refrigerant to the main tank 80. Further disposed within the housing 12 and forming a portion of the recovery circuit can be a filtration system such as, for example, an oil separation system coupled to or integrated with the recovery circuit and/or flushing circuit for cleaning the recovered refrigerant. The oil separation system can include an oil accumulator tank 100, and an oil separator filter 110. The unit 10 can further include a fresh oil canister 140, which can be mounted within the housing 12. A recover oil container 142 can also be provided and mounted within the housing 12 so as to receive oil drained from the accumulator tank 100. Having briefly described the major components in one embodiment of the unit 10 shown in FIGS. 1 and 2, a more detailed description of the system follows in connection with FIG. 2.

FIG. 2 is a schematic flow diagram of the refrigerant maintenance system incorporated in the system shown in FIG. 1. In a refrigerant recovery operation, the hoses 16 and 18 can be coupled to the vehicle and the recovery cycle can be initiated by the opening of the dual back-to-back high pressure and low pressure solenoids 150 and 152, respectively. This allows the refrigerant within the vehicle to flow through conduits 154 through a check valve 156 and a recovery valve 158 into a manifold 120. A low pressure switch 160 can be configured to sense pressure in the recovery circuit and provide an output signal to the microprocessor through a suitably programmed interface circuit so as to detect when the pressure of the recovered refrigerant is down to, for example, 13 inches of mercury. The refrigerant can then flow through the remainder of the recovery circuit, which can further include valve 162 and conduit 166 into the accumulator tank 100 where it travels through an output conduit 168 through a water separating molecular sieve 170 to an input of compressor 60. Compressor 60 can draw the refrigerant through a valve 172 and through the oil separating filter 110 which circulates compressor oil back to the compressor through conduit 174 and oil return valve 176. A pressure transducer 178 can be coupled to the microprocessor which can be further programmed to determine the upper pressure limit of, for example, 435 p.s.i. to shut down the compressor in the event the pressure becomes excessive for the unit 10. The compressed refrigerant can exit the oil separator 110 and into the remainder of the recovery circuit, which can further include a conduit 180, a check valve 182 and a heating coil 102. The heating coil 102 can assist in maintaining the temperature in accumulator 100 within a working range. The refrigerant can continue through recovery circuit including through conduit 186 to a condenser 130 and next flows through check valve 188 and into the main tank 80. With the main tank 80 holding clean refrigerant, a clean source of refrigerant can be made available for the flushing operation. The clean refrigerant source can be supplemented if needed by the supply tank 90 coupled to the main tank 80.

The unit 10 can include means to flush the recovery circuit with a source of clean refrigerant. More specifically, the flushing circuit can be coupled to the recovery circuit and the main or internal refrigerant storage tank 80 to flush the recovery circuit, including the service hoses 16 and 18 and any associated solenoids, with clean refrigerant so as to remove residual additives and oils remaining in the circuit. Any additives and/or oils in the unit 10 can be further separated, for example, using the oil separator 110 and may be further drained and disposed appropriately.

The flushing operation can include determining that the couplings 17 and 19 are disconnected from the vehicle so as to prevent damage to the vehicle's air conditioning or cooling system. For example, a sensor can be provided to detect when the couplings 17 and 19 are connected to a prescribed connection point on the unit 10 and disconnected from a cooling system. Such connection may be considered a "hose holder" connection (where the hoses can be stored with the unit when not in use), for example. The sensor can be further configured so as to disable the flushing operation upon detecting a connection between the unit 10 and a cooling system. Alternatively, the electronic control module 20 can be configured or programmed to prompt a technician that a flush process can be initiated after detecting that the couplings 17 and 19 are not connected to a vehicle.

For example, a pressure sensing operation can be configured and provided in which high-side and low-side pressure transducers 13' and 15', respectively, determine the connectivity of unit 10 to a vehicle for the recovery process as described above. In response, various components such as low-side inlet, high-side inlet, solenoids may be triggered to open so as to initiate and carry out the recovery process. When the recovery process is complete, the transducers 13' and 15' can sense vacuum pressure so as to initiate the flushing operation of the recovery circuit and its associated components.

As part of the flushing process, the recovery circuit can be placed under a vacuum pressure. More specifically, the hoses 16 and 18 can be subjected to a vacuum to relieve any residual oils and/or additives remaining therein. The flushing process can further involve opening additional inlets and solenoids to initiate liquid refrigerant from supply tanks, for instance, main tank 80 and/or supply tank 90 coupled to main tank 80, through the flushing circuit and into the recovery circuit. The flushing circuit can be coupled to the recovery circuit at a joint such as, for example, manifold 120 to continue to flush clean refrigerant through a low-side charge solenoid out a low-side coupler and back into a high-side coupler, through a high-side inlet recover solenoid and into the system oil separator 110. The process is completed as clean refrigerant is pumped through the compressor 60, the oil separator 110 and back into the supply tank 90. The flush process may be additionally repeated, for instance, including opening a high-side charge solenoid and closing a low-side charge solenoid with a high-side inlet closed and a low-side inlet opened in order to flush a low-side inlet portion of the flushing and/or recovery circuit.

During the recovery and flushing processes, an oil separation system can be provided to separate oil from the recovered refrigerant. The oil separation system can include the accumulator 100 and oil separator 110, which comprises a generally cylindrical tank as seen in FIG. 1. The separator 100 can have an oil drain 104 at the bottom thereof (FIGS. 1 and 2), which can further communicate with a conduit 105 coupled to an orifice 106 that can restrict oil flow. Orifice 106 can be configured as an inline fitting, which is schematically shown in FIG. 2. Orifice 106 can have a diameter ranging from about 0.035" to about 0.050" and preferably to about 0.042," and selected to limit the flow rate of oil from accumulator 100 to an oil tank 142. The orifice 106 can be configured, in connection with the control of oil drain solenoid 109 and check valve 108 to minimize or otherwise prevent the loss of refrigerant. For example, a pressure sensing switch 107 and electrically actuated oil drain solenoid 109 can be provided and coupled to or in communication with microprocessor carried on circuit board 22. The oil drain 104 can be coupled by conduit 113 to an oil separator associated with a refrigerant identifier instrument, which can be integrated into the maintenance unit 10. The refrigerant identifier instrument can identify the type of refrigerant in the system.

Figure 3:
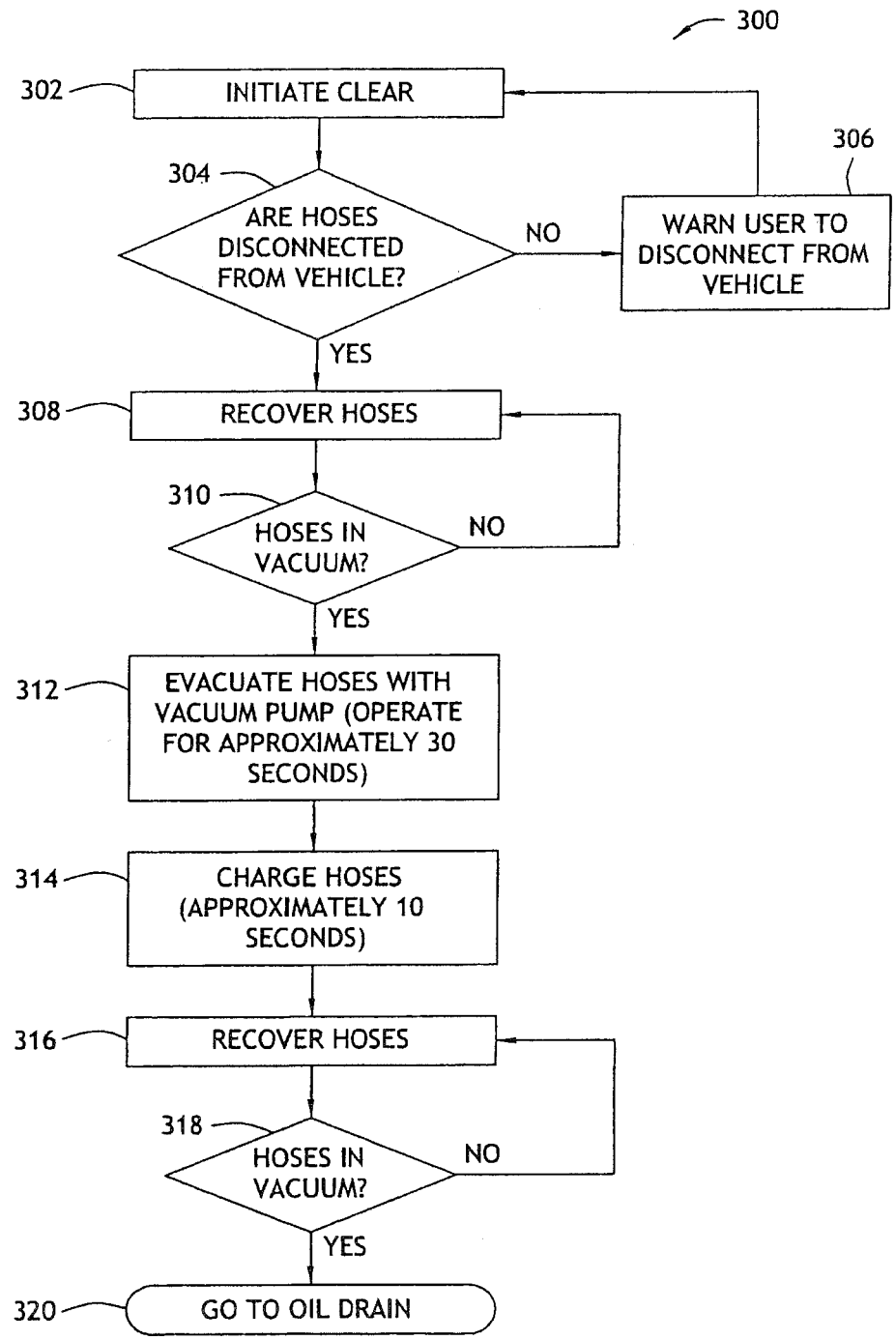
FIG. 3 illustrates the initial clear function diagram according to an embodiment of the invention.

FIG. 3 illustrates the initial clear function diagram 300 according to an embodiment of the invention. The clear function can be programmed into the unit and executed by the processor. The operator can initiate the clear or flush function by pressing a clear button on the control panel at step 302. The microprocessor through the sensors, described above, can sense whether the couplings 17 and 19 are disconnected from a vehicle's cooling system. If no or the couplings are still attached to the vehicle's cooling system, the unit can warn the operator at step 306 to disconnect the couplings from the vehicle's cooling system and returns to step 302. If yes or the couplings are disconnected from the vehicle's cooling system, the unit proceeds to step 308, where the refrigerant remaining the hoses 16, 18 are recovered. At step 310, the unit determines if the hoses 16, 18 are in a vacuum in order to recover any remaining refrigerant or contaminants, such as oil. If no, then the unit returns to steps 308 and 310 until a vacuum is detected. If yes, the unit proceeds to evacuate the hoses 16, 18. The vacuum operation can last for about 30 seconds, but can last as long or as short as desired by the operator. At step 314, the hoses 16, 18 are again charged with refrigerant so that any remaining contaminants can be flushed from the hoses. Step 314 can be operated for about 10 seconds, but can be operated as long or as short as desired by the operator. Additionally, step 314 can be repeated as needed to clear out any remaining contaminants. After, step 314, the unit proceeds to step 316 to recover the refrigerant from the hoses 16, 18. Again, at step, 318, the unit determines if the hoses are in a vacuum. If no, then the unit returns to steps 316 and 318 until a vacuum is detected. If yes, the unit proceeds to evacuate the hoses 16, 18. At step 320, the unit proceeds to the oil drain function as described in FIG. 4.

Figure 4:
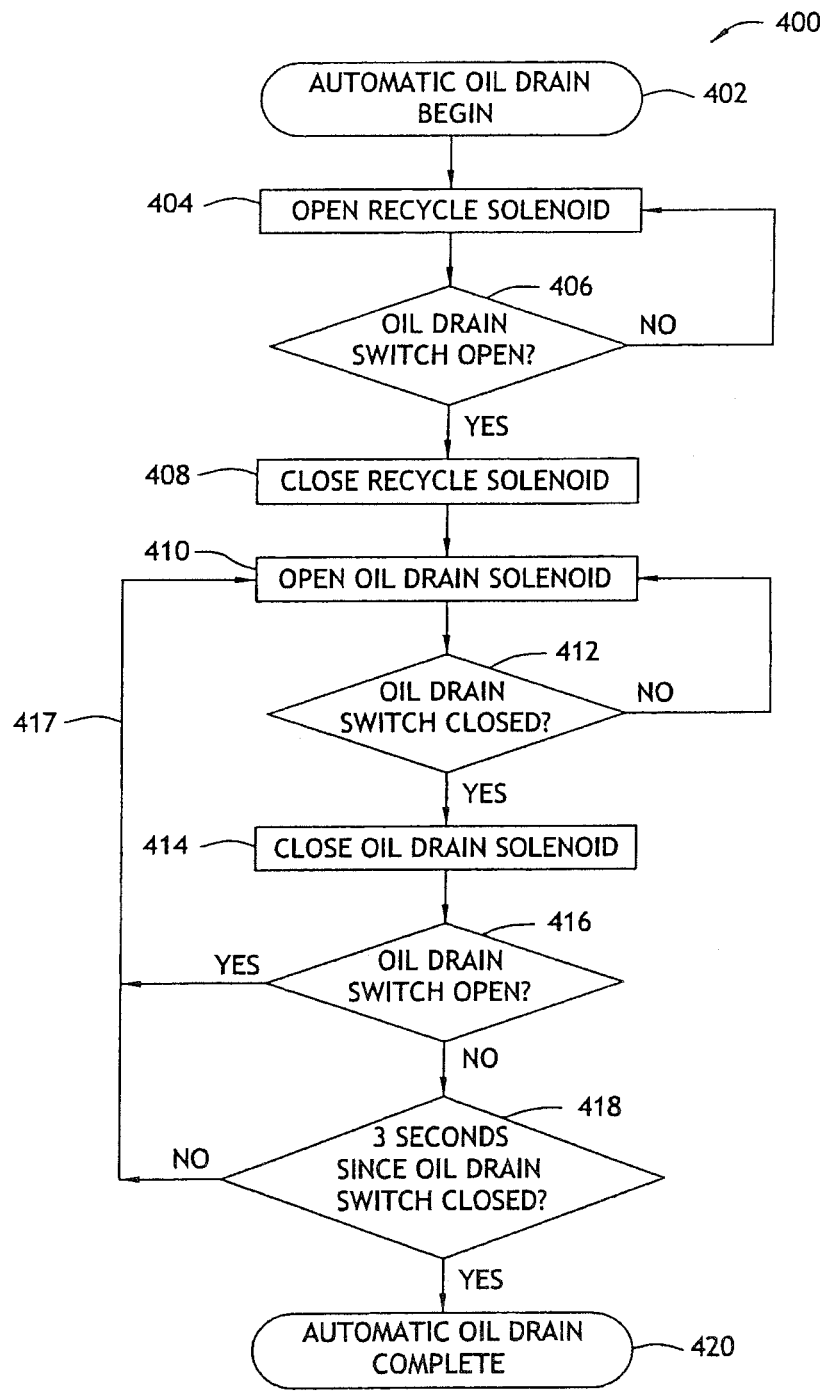
FIG. 4 illustrates an automatic oil drain method 400 according to an embodiment of the invention.

FIG. 4 illustrates an automatic oil drain method 400 according to an embodiment of the invention. From the recovery and flushing processes described above, the accumulator tank 100 holds recovered oil from the vehicle's air conditioning system or other refrigeration circuit being serviced. After the completion of the flushing or clear function, the automatic oil drain subroutine 400 programmed into the unit and executed by the microprocessor can begin, as indicated by block 402. Initially, the recycle solenoid 192 can be opened, as indicated at step 404, to pressurize the system by allowing liquid refrigerant from tank 80 into the accumulator tank 100. The microprocessor can further monitor the oil drain pressure switch 107 at step 406 and close the recycle solenoid 192 at step 408 (if pressure switch is open) once the oil drain pressure switch detects a set pressure such as about 16 psi.

Switch 107 can be configured to open and close at predetermined pressures, for example, to open at about 16 psi and close at about 9 psi. Upon detecting approximately 16 psi pressure, the microprocessor can receive a signal from the opening of switch 107 in order to open the oil drain solenoid 109, as performed in step 410, thus allowing oil to drain through orifice 106 located at the outlet of the accumulator tank. During the draining process, the pressure begins to drop between the accumulator tank and the oil drain pressure switch 107. The microprocessor can further monitor the pressure switch 107 to determine when pressure drop reaches 9 psi, as indicated by step 412, to provide a signal for closing the oil drain solenoid 109, as indicated by step 414. Once the oil drain solenoid is opened, the microprocessor can monitor the state of the oil drain pressure switch 107 to determine whether it is opened or closed, as indicated by block 412. If it remains open, the drain solenoid stays open as the program cycles through steps 410 and 412. Once the switch 107 closes indicating that 9 psi has been reached, the oil drain solenoid 109 is closed, as indicated by step 414. The program continues monitoring the oil drain pressure switch 107, as indicated by step 416, to determine whether it is open or closed. Once it opens again the drain solenoid is opened, as indicated by the loop 417 back to step 410. If the drain switch is not opened, the program determines, at step 418, if it has been at least three seconds since the oil drain switch was closed. If not, the program cycles back to step 310, continuing the draining process. If is has been three seconds or longer since the oil drain switch has been closed, the automatic oil drain sequence is completed, as indicated by step 420, and the drain solenoid 109 remains closed.

The microprocessor can thus continue to monitor the status of switch 107 and control the oil drain solenoid valve 109. By using the rise time of the pressure, the amount of refrigerant loss is kept to a minimum necessary only to push the recovered oil out of the accumulator tank regardless of the amount of oil. The pressure in the accumulator tank drops off relatively slowly until the oil is pushed through the orifice, then very rapidly drops as refrigerant vapor passes through, quickly ending the oil draining process. The check valve 108 prevents the oil drain solenoid from being forced open when there is a vacuum in the accumulator tank.

Upon completion of the recovery and flushing cycles, an operator can estimate the amount of oil accumulated in tank 142 and injects the same estimated amount of oil from the fresh supply of oil 140 through valve 141 (FIG. 2) and into the vehicle's air conditioning system or other cooling system being serviced. The electrically operated solenoid valve 141 may be controlled by the microprocessor to meter a precise amount of oil through entry of the fluid amount of oil necessary as entered by keyboard 35 based upon the amount of recovered oil. The new oil is supplied to the refrigerant circuit during the charging portion of the maintenance cycle.

Thus, it is seen with the system of the present invention, the recovered oil from a refrigerant circuit being serviced is automatically drained from the separator/accumulator with a minimal loss of refrigerant from the system, thereby providing an environmentally appropriate recovery system which allows the accurate determination of oil necessary to replace the recovered oil from the system. It accomplishes this goal without operator intervention, thereby greatly facilitating the collection or recovered oil. Additionally, by flushing the recovery system after use, cross-contamination of oils and additives in various cooling system under service is prevented.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A refrigerant servicing device comprising:
an inlet for receiving refrigerant from a system to be serviced;
an oil separator configured to separate oil out of the refrigerant;
a holding tank configured to hold the refrigerant;
a clean refrigerant tank configured to contain clean refrigerant to add to the refrigerant to be serviced;
an outlet configured to provide an outlet for serviced refrigerant to be returned to the system to be serviced; and
a controller configured to:
control the inlet, and the outlet;
move clean refrigerant to remove the refrigerant from the system to be serviced;
separate oil from the refrigerant;
add clean refrigerant to the refrigerant being serviced to achieve a desired total amount of refrigerant and return the refrigerant to the system being serviced;
detect when connecting hoses connecting the refrigerant servicing device to the system to be serviced are connected to the system to be serviced;
forwarding an alert to disconnect the pair of hoses from the system being serviced when the hoses are connected to the system being serviced; and
flush the refrigerant servicing device with clean refrigerant after the refrigerant service device has serviced refrigerant.

2. The refrigerant servicing device of claim 1, further comprising:
a water separator configured to remove moisture from the refrigerant being serviced.

3. The refrigerant servicing device of claim 1, further comprising:
a filter configured to filter the refrigerant being serviced.

4. The refrigerant servicing device of claim 1, further comprising:
a vacuum pump controlled by the controller to remove the refrigerant from the system to be serviced.

5. The refrigerant servicing device of claim 4, wherein the vacuum pump is used to flush clean refrigerant through the refrigerant servicing device.

6. The refrigerant servicing device of claim 1, further comprising:
an oil outlet configured to allow oil to be removed from the refrigerant servicing device.

7. The refrigerant servicing device of claim 6, wherein the oil is returned to a compressor in the system to be serviced.

8. The refrigerant servicing device of claim 6, wherein the oil outlet is controlled by the controller.

9. The refrigerant servicing device of claim 1, wherein the controller is configured to not flush the refrigerant servicing device when the hoses are connected to the system being serviced.

10. The refrigerant servicing device of claim 9, further comprising:
a flushing position for the hoses for when the refrigerant servicing device is flushed with clean refrigerant.

11. The refrigerant servicing device of claim 10, wherein the controller is configured to determine when the hoses are in the flushing position.

12. A refrigerant servicing device comprising:
means for inletting for receiving refrigerant from a system to be serviced;
means for separating oil from refrigerant configured to separate oil out of the refrigerant;
first means for containing a fluid configured to hold the refrigerant;
second means for containing a fluid configured to contain clean refrigerant to add to the refrigerant to be serviced;
means for outletting configured to provide an outlet for serviced refrigerant to be returned to the system to be serviced; and
means for controlling configured to:
control the means for inletting, and the means for outletting;
move the clean refrigerant to remove the refrigerant from the system to be serviced;
separate oil from the refrigerant;

add clean refrigerant to the refrigerant being serviced to achieve a desired total amount of refrigerant and return the refrigerant to the system being serviced;

detect when a pair of hoses connecting the refrigerant servicing device to the system to be serviced are connected to the system to be serviced;

forwarding an alert to disconnect the pair of hoses from the system being serviced when the hoses are connected to the system being serviced; and flush the refrigerant servicing device with clean refrigerant after the refrigerant service device has serviced refrigerant.

13. The refrigerant servicing device of claim 12, further comprising means for separating water from the refrigerant being serviced.

14. The refrigerant servicing device of claim 12, further comprising means for filtering the refrigerant be serviced.

15. The refrigerant servicing device of claim 12, further comprising:

means for pumping the refrigerant through the refrigerant servicing device controlled by the means for controlling to remove the refrigerant from the system to be serviced.

16. A method of cleaning a refrigerant servicing device comprising:

detecting when a pair of hoses connecting the refrigerant servicing device to a system to be serviced are connected to the system to be serviced;

forwarding an alert to disconnect the pair of hoses from the system being serviced when the hoses are connected to the system being serviced; and detecting that the pair of hoses are not connected to system; and then circulating clean refrigerant through the device.

17. The method of claim 16, further comprising:

evacuating a residual refrigerant that had previously been serviced from the device.

18. The method of claim 17, further comprising:

expelling the residual refrigerant from the device.

19. The method of claim 16, further comprising:

removing oil from the device.

* * * * *